Dec. 1, 1959   J. THILLAIMUTHU   2,914,939
ALTERNATING CURRENT GENERATOR COMPUTING MECHANISM
Filed April 4, 1955   5 Sheets-Sheet 2
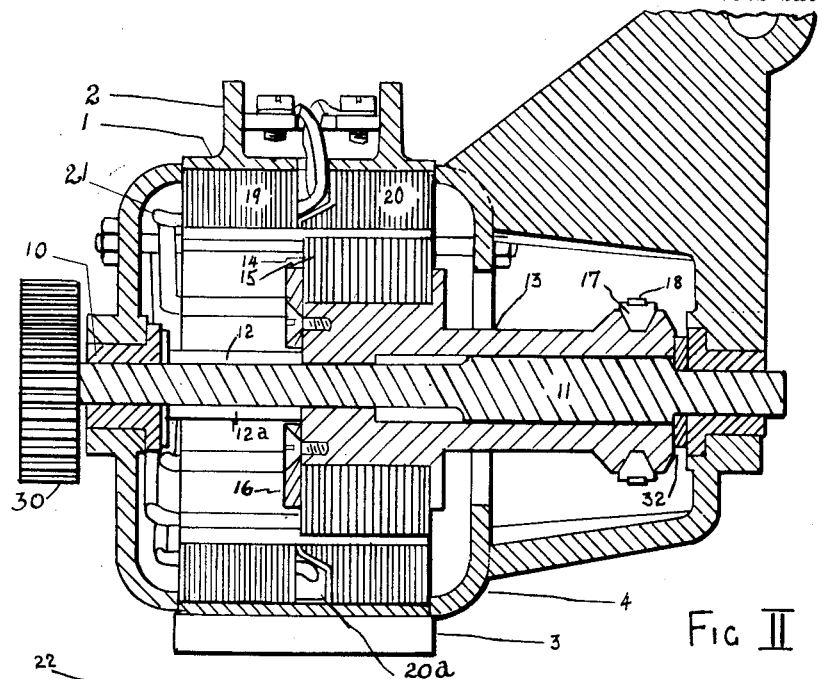
Fig II
Fig IIA
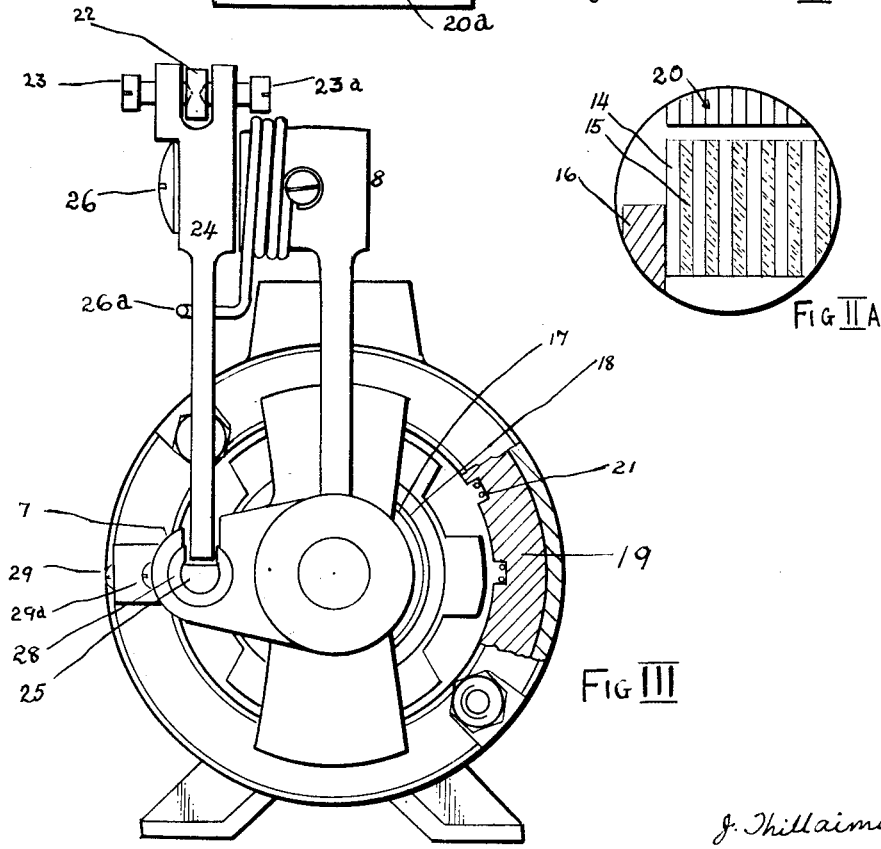
Fig III
J. Thillaimuthu
INVENTOR Dec. 1, 1959     J. THILLAIMUTHU     2,914,939
ALTERNATING CURRENT GENERATOR COMPUTING MECHANISM
Filed April 4, 1955     5 Sheets-Sheet 3
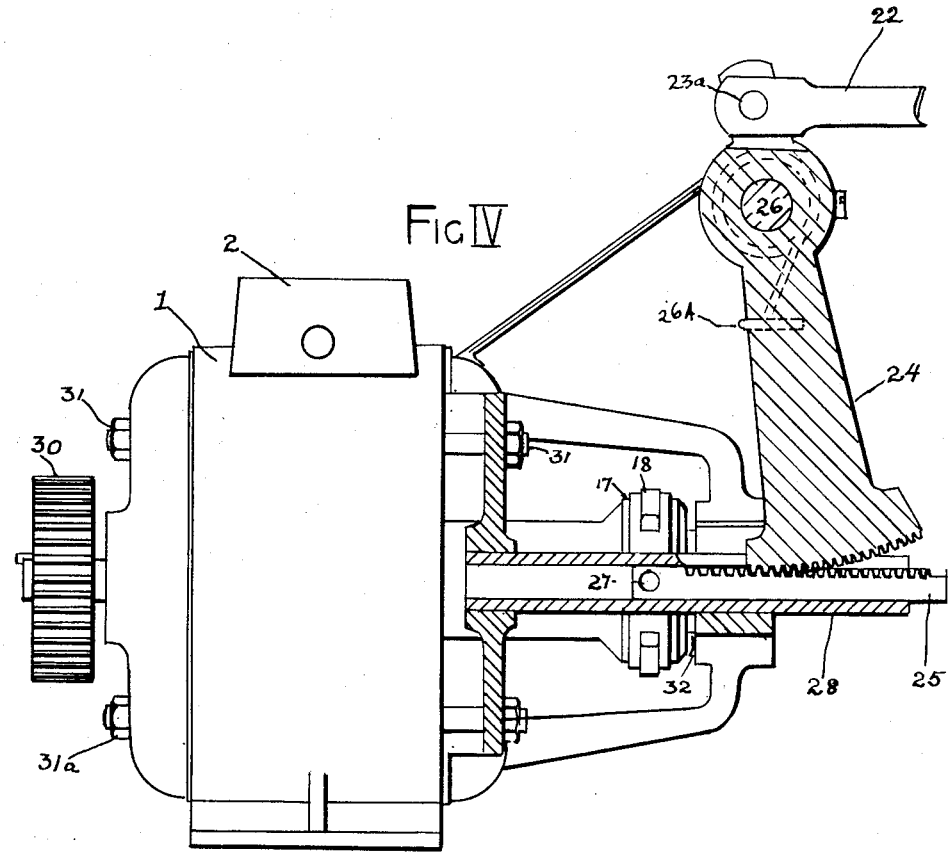
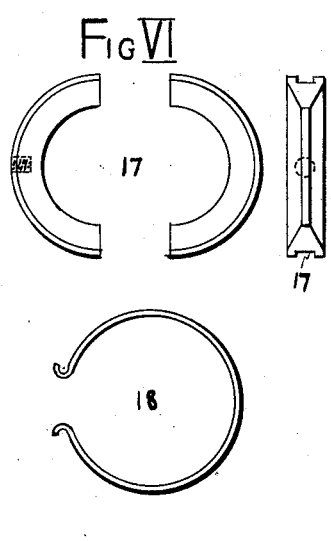
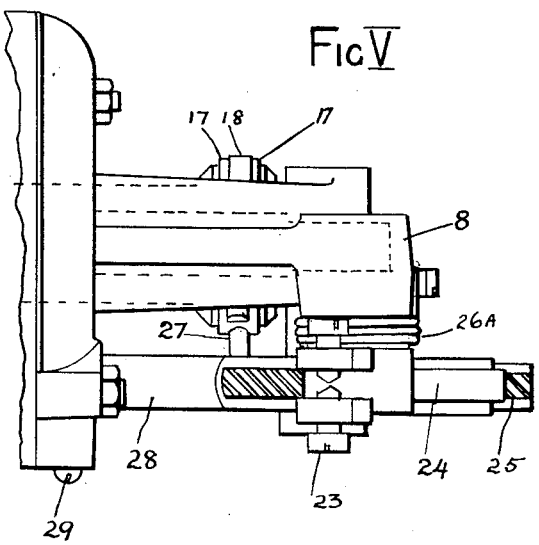

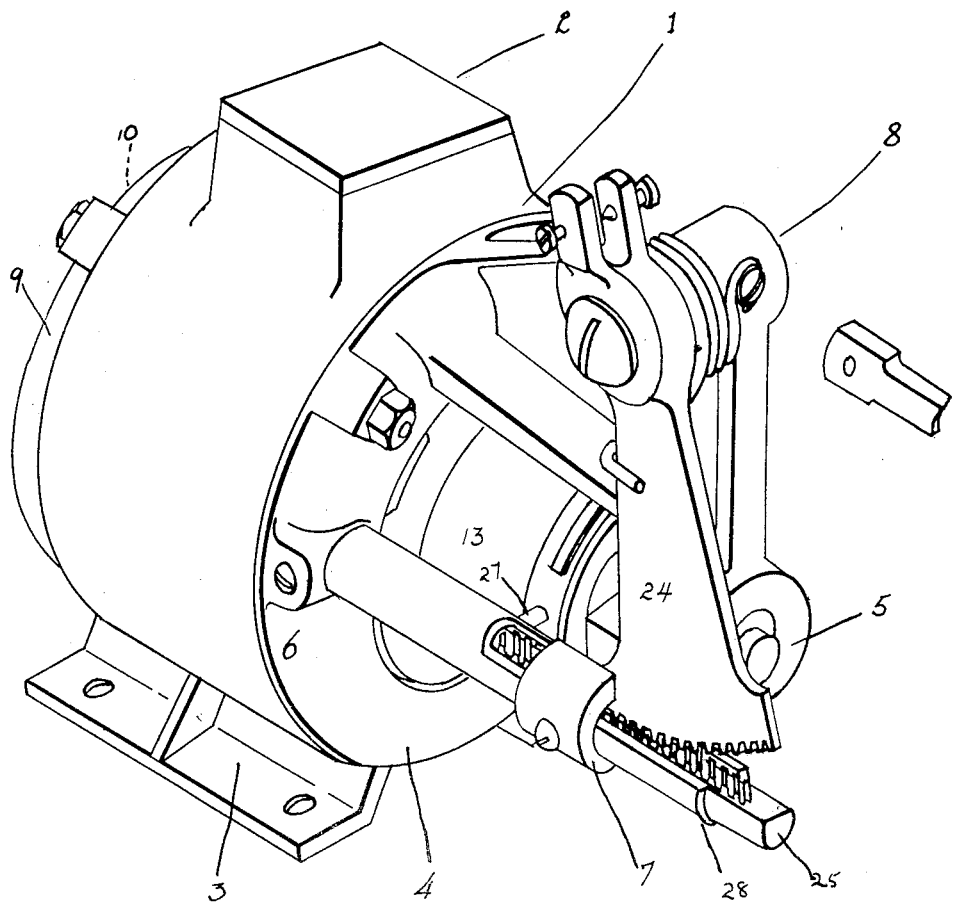
Fig. I

Dec. 1, 1959  J. THILLAIMUTHU  2,914,939
ALTERNATING CURRENT GENERATOR COMPUTING MECHANISM
Filed April 4, 1955  5 Sheets-Sheet 4
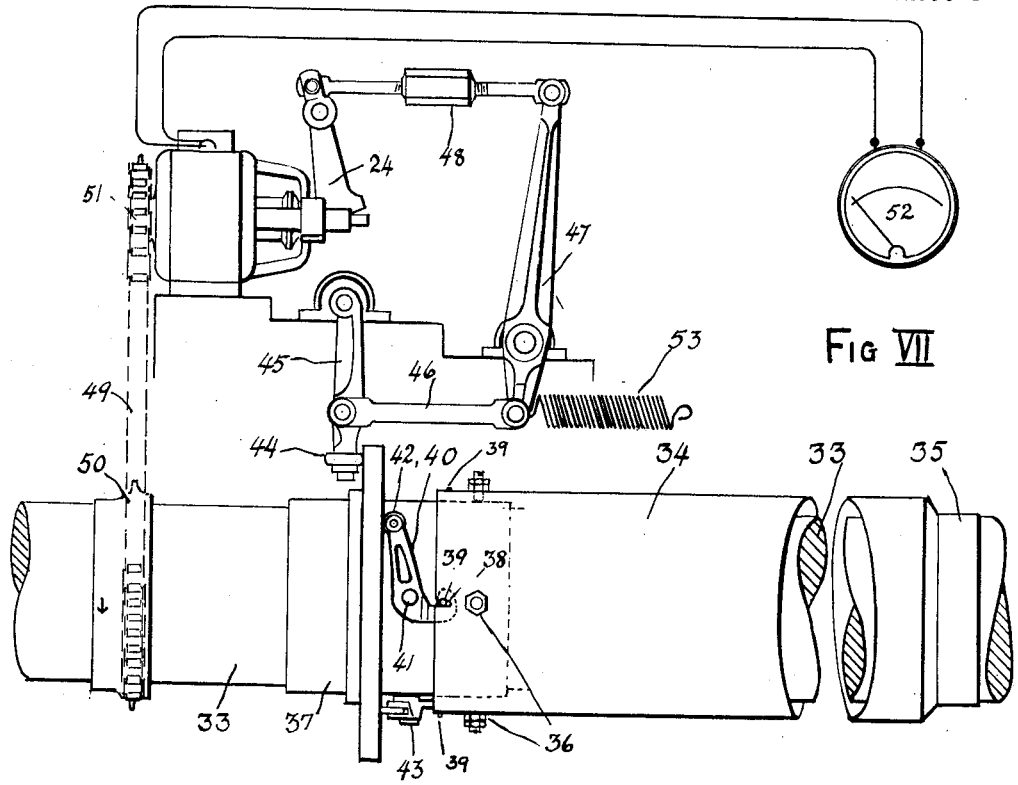
Fig VII
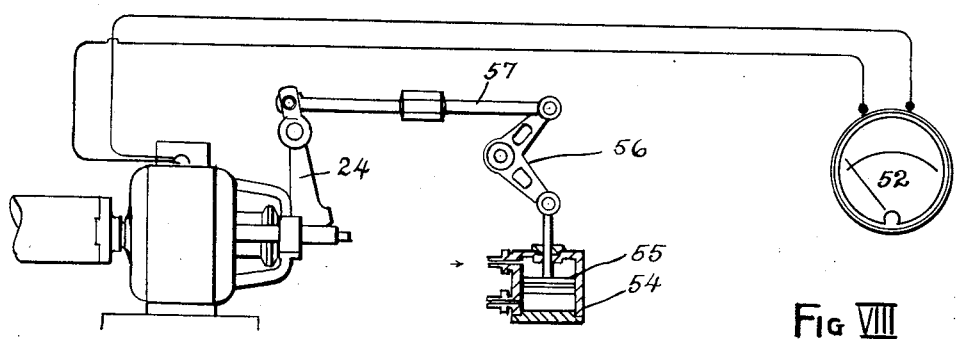
Fig VIII
J. Thillaimuthu
INVENTOR

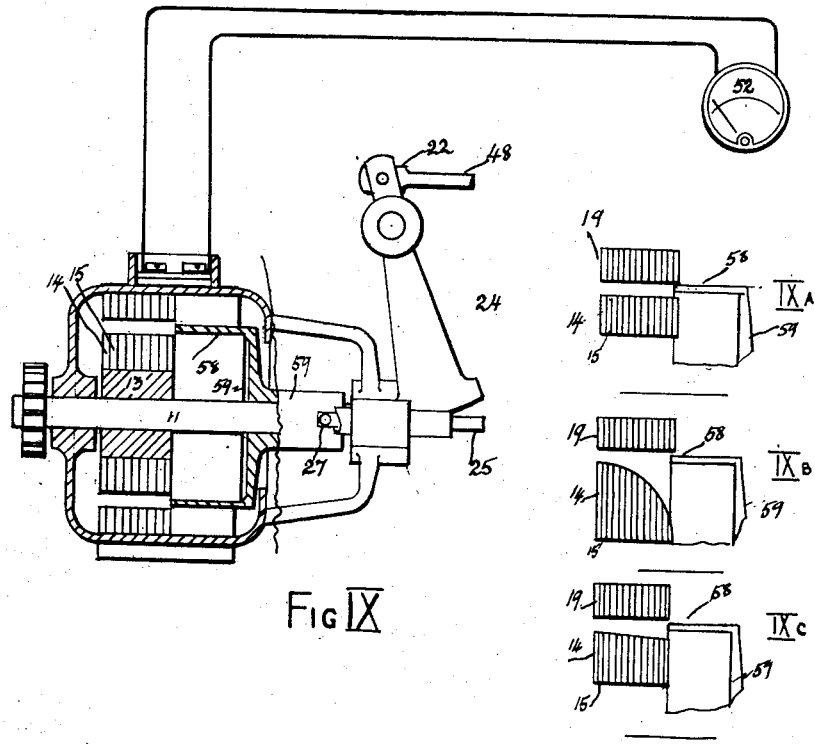
Fig IX
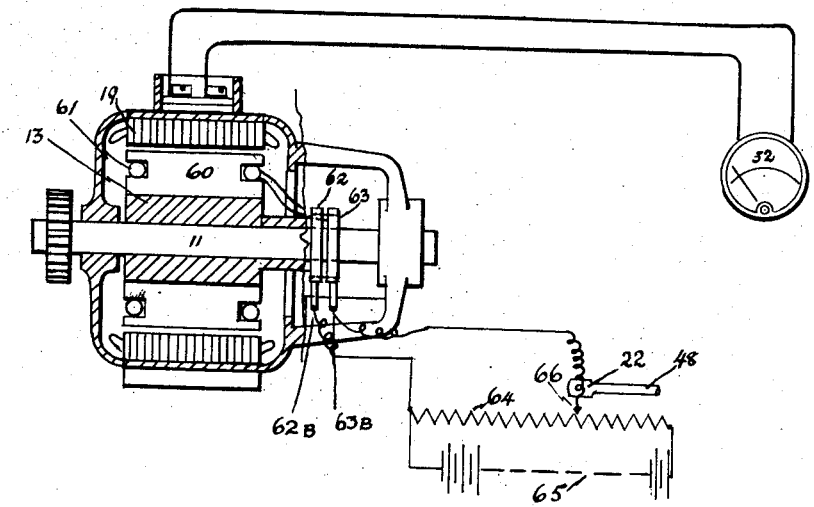
Fig X

United States Patent Office 2,914,939
Patented Dec. 1, 1959

2,914,939

ALTERNATING CURRENT GENERATOR COMPUTING MECHANISM

Jeyaretnam Thillaimuthu, Penang, Malaya

Application April 4, 1955, Serial No. 499,188

2 Claims. (Cl. 73—136)

This invention relates to an apparatus for computing instantaneously and continuously the product of two independent variables one of which can be reduced to or translated as speed of rotation of a shaft, for example continuous solutions to an equation of the type $X = Y \times Z$ where Y and Z are independent and vary within known maximum and minimum limits and where Y or Z is function of speed. The invention is primarily designed for dynamometers.

This invention takes advantage of two well known characteristics of a simple alternating current generator hereinafter referred to as A.C. generator which have not before been used together for this purpose.

(1) The voltage generated by a simple A.C. generator is proportional to speed.

(2) The voltage generated is also proportional to the total effective magnetic flux between the rotor and stator.

An A.C. generator fundamentally comprises a coil or coils of electrically conductive wire rotating between poles of a magnet or magnetic field or a magnetic field rotating within suitably shaped coils arranged on the inside of a cylindrical core carrying the conductors and producing an electric current which alternates in polarity. The magnetic field may consist of permanent magnets or electromagnets. For purposes of clarity, only one form of the A.C. generator, that with a rotating permanent magnet rotor, will be described.

If therefore an A.C. generator be driven at a speed proportional to the first variable, and the effective magnetic flux varied according to the second variable the voltage generated will be proportional to the product of the two variables at any instant.

Variations of the total effective flux can be made by either of the four methods:

(i) In the case of a permanent magnet field, by moving it longitudinally relative to the stator, or (ii) By moving the stator assembly longitudinally, relative to the rotor, or (iii) By moving a cylindrical magnetic shield in the gap between the rotor and stator, or (iv) In the case of an electrically excited A.C. generator by controlling the electric current flowing through the field coils on the rotor.

An immediate application for which the invention is particularly suited is for the computing of horsepower in dynamometers, where by definition, horsepower is proportional to the product of speed and torque or any equivalent of torque.

The useful power output of a prime-mover is measured in terms of the common unit known as horsepower and in current practice it is generally calculated from measured values of speed and torque, in the case of power transmitted by the shaft. In the case of internal combustion engines it has been proved that the brake mean effective pressure, or manifold pressure, in the case of supercharged engines, is directly proportional to the torque; it will be shown that this invention can be used for such cases also. Other applications are for the measurement of thrust horsepower in jet engines, where speed of aircraft and thrust are measurable, and for measurement of tractive power or traction horsepower where speed of the traction vehicle and its drawbar pull are known.

Reverting to the first example of measurement of the horsepower of a prime-mover by the power transmitted by its drive shaft, it has been stated that the horsepower is proportional to the speed and torque to which the shaft is subjected to in the process.

Whereas speed and torque can readily be measured independently by various known means no satisfactory method exists whereby horsepower can be computed instantaneously and continuously for varying speeds and torque.

The conventional methods of horsepower measurement are therefore time consuming and further give only an average horsepower, over the period during which the measurement of speed and torque is taken. Incidentally it can further be used by a process of inversion, to provide a practical method for determining the power requirements for driving a mechanism or machine or assembly of machines at any given speed off a shaft.

In this example, if the A.C. generator is driven at a speed proportional to that of the shaft transmitting power, engine or prime-mover or to translational velocity of aircraft or vehicle and the magnetic flux is varied in accordance with the torque or its equivalent the voltage generated will be found to be proportional to horsepower.

For in an A.C. generator by definition, voltage = speed × flux × Constant but if speed of shaft is proportional to speed of generator and magnetic flux is proportional to torque, then voltage = speed × torque × Constant but H.P. = speed × torque × Constant Therefore voltage is proportional to horsepower.

The rotor of the generator can be coupled directly as an extension to the shaft of the prime-mover or geared to it at some predetermined ratio through a non-slip drive.

The variation of total effective magnetic flux is to be performed automatically by one of the above four methods in proportion to torque transmitted, by means of an instrument hereinafter referred to as the torquemeter and can also be performed mutatis mutandis by tractive effort, brake mean effective pressure or thrust in the cases, respectively, of vehicles, internal combustion engines and jet turbines. Detailed reference will be made in the case of a mechanical torquemeter and brief examples of other types will be given. Taking the case of torque, it can be measured by any of the standard methods mechanical, hydraulic, electrical or pneumatic provided such methods afford a relative angular or linear movement of a component which can be magnified by gears, levers, cams, servomotors or solenoids and the like to control the relative position of the rotor and thus the total effective flux.

Generally described, this invention comprises: a precision built A.C. generator hereinafter referred to as computor having a permanent magnet rotor and rotated at a speed proportional to that of engine; and which either can be moved along its axis relative to the stator or be provided with an axial magnetic shield, or electromagnetic field poles with a means of varying the field current, such that the total effective flux influencing the windings can be varied in a precise manner; an actuating mechanism for moving the rotor, or stator, magnetic shield or varying electric current as the case may be, in accordance with the second variable; and a voltmeter calibrated in units of the product required.

The second variable in the case of dynamometric measurement is torque, brake mean effective pressure, thrust or drawbar pull and therefore accessory equipment for such is respectively the torquemeter; mechanical, hydraulic electrical or pneumatic, pressure gauge, thrust gauge and drawbar spring or balance.

Provision can also be made for independently gauging speed by means of a separate winding influenced by a second rotor and coil on a second voltmeter calibrated in units of speed and for visual reading of the second variable by graduating the actuator movement in order to calibrate and or check the first voltmeter calibrated in units of the product.

This invention further comprises: a precision built A.C. generator of the type described having a permanent magnet field for the stator movable relative to the rotor, a rotor with coil windings and slip rings, an actuator as described above and a voltmeter calibrated in units of the product. In either case the rotor is coupled at some predetermined ratio to the shaft giving the speed variable.

One form of this invention is detailed in the accompanying drawing sheets Figures I to VI inclusive and two arrangements for measurement of transmitted horsepower of a shaft is shown in Figs. VII and VIII. Other forms of the invention are shown in Figs. IX and X.

Detailing the drawings:

Fig. I shows the A.C. generator or computor unit in isometric view.

Fig. II shows the same in full sectional elevation.

Fig. IIA shows details of the magnet laminations.

Fig. III shows the same in end elevation partly sectioned.

Fig. IV shows the side elevation showing actuating mechanism partly sectioned.

Fig. V shows plan of part showing the rotor actuating mechanism.

Fig. VI shows details of split ring and spring clip.

Fig. VII shows diagrammatically the arrangement as dynamometer detailing relative positions of computor, actuator and controlling device for the rotor, torquemeter of the torque tube and the indication instrument.

Fig. VIII shows diagrammatically the arrangement as dynamometer for measurement of power of aircraft engines having a hydraulic torquemeter.

Fig. IX shows a type of computor with the magnetic shield for flux variation in part sectional elevation.

Fig. IXA shows enlarged, the gap between the rotor and stator laminations with the magnetic shield in position for ordinary linear variables, in section and pole profile.

Fig. IXB shows similarly details of the gap for simple sinusoidal functions and the pole profile.

Fig. IXC shows similarly details of the gap and pole profile for other non linear variables and particularly parabolic functions.

Fig. X shows the computor with an electromagnetic field coil on rotor where magnetic flux is varied by controlling current in part sectional elevation.

Referring to Fig. I, the principal external parts visible are the cylindrical casing 1, upper part containing the terminal box 2 and fixing brackets 3 at the lower end.

Item 4 is a right hand cover which is a complex casting containing integral with it, the main bearing 5, rack guide bearings 6 and 7, sector wheel bearing 8.

The drive end cover 9 is partly visible and carries the other main bearing 10 seen clearly in Fig. II. The end of main shaft is visible at 11.

Main shaft 11 has machined in it two splines at 12 and 12a, along which slides the rotor assembly. The rotor assembly comprises cylindrical body 13 which is a sliding fit on main shaft and has on one end a machined surface for receiving a multipole magnet made of alternating layers of laminated permanent magnetic material 14 and layers of diamagnetic or non magnetic material 15 detailed in Fig. IIA the function of which will be explained later. A clamp ring 16 holds the magnet assembly in place. At the other end of the rotor assembly is machined a V-groove to take a split ring 17, further detailed in Fig. VI. A circular steel clip retainer 18 locks the two halves of the split ring in the groove.

The purpose of the split ring and V-groove arrangement is for imparting longitudinal movement to the rotor while it is revolving, for the controlling of position of rotor relative to stator.

The stator assembly is made up of laminations of soft iron in two equal width sections, the main stator carrying coils being 19 and the keeper section 20. A portion of the keeper laminations is machined away circumferentially as at 20a, to accommodate coils shown at 21. The purpose of the keeper is to divert the flux not wanted in the stator.

The rotor control mechanism is shown in Fig. IV; linkage bar end 22 is connected by two pivot screws 23 and 23a, to the forked end of a gear sector 24. The gear teeth of the sector engage a rack 25. The sector is fitted to bearing 8 by a pin 26. Spring 26a, held by a set screw may be used to return sector 24 to its zero position if required. The rack 25 carries a screwed pin 27 which engages and is screwed into the split ring 17. Any longitudinal motion of the rack causes an equal movement of the ring and the rotor assembly connected with it.

The rack slides in the rack gear guide 28, which is a hollow tube with slots machined in it to allow free movement of screwed actuating pin 27 and sector gear 24.

The rack guide is supported by the rack guide bearings 6 and 7 and is fixed by screws 29 and 29a, seen in Fig. III.

Other features are drive pinion 30, replaceable by cog wheels or direct couplings and the like, fixing bolts and nuts 31 and 31a, for holding the unit together, and thrust washer 32.

In the drawings the rotor is shown in the minimum torque position where it is under the keeper section of the stator.

Referring to Fig. VII which shows the general arrangement of the equipment for measurement of horsepower transmitted by a long shaft. The following are represented: the computer, a torque tube type torquemeter, accessory equipment for measuring the twist of the shaft 33 rotating under load, and a voltmeter calibrated in units of horsepower.

The torquemeter shown comprises: a torque tube 34 of a diameter larger than that of the shaft, having a length of about thirty times the diameter of the shaft, and made of steel, shrunk or otherwise rigidly fitted at one end 35 to the shaft. The other end of the torque tube is free but is maintained concentric with the shaft by three or more round bottomed steel screwed studs 36 resting on the smooth surface of a sleeve 37 which is fitted to the shaft near free end of torque tube. Slots 38, four in number, are machined at the free end of the torque tube, and are equally spaced on the circumference. Each of these slots engages hardened pins 39 at one end of lever brackets 40, pivoted on studs 41 screwed or riveted to sleeve 37. Four lever brackets one for each slot are fitted but only two are shown for clarity. At the other end of lever bracket 40 is a roller 42 which bears against a hardened plate cam 43 which is made in the shape of a ring and is capable of sliding freely along sleeve 37. When the shaft is transmitting power a twist proportionate to the transmitted torque will be apparent in the shaft, the torque tube remaining free of twist, the relative movement between the free end of the torque tube and stud 41 will cause the bracket to turn against direction of twist and result in the rollers 42 concertedly pushing the plate cam 43 forward along the sleeve.

The longitudinal movement of the plate cam is taken up by roller 44 fitted to free end of pivoted follower arm 45. By means of push rod 46, lever 47, and linkage bar 48 the movement is magnified and transmitted to the forked end of sector gear wheel 24. The sector will move rack 25 forward and by the screwed pin 27 and ring 17 there will be a corresponding movement of the rotor carrying the magnets.

The computer is driven by a chain drive 49 through sprocket wheels 50 and 51.

For purposes of explanation let it be first assumed that the computer is running at a given speed, the voltage generated will be proportional to flux, that is, the extent to which the rotor magnet influences the stator coils, the keeper diverting the unwanted flux.

Secondly let it be assumed that the torque is fixed and therefore the rotor position is fixed, but the shaft speed is varied from zero to a predetermined value. It will be seen that the voltage will vary from zero to a maximum value again.

Thirdly removing the restrictions let the torque and speed vary simultaneously, it will be found that the voltage generated at any instant will be a function of the product of speed and effective flux.

The voltage thus generated is varying not only in strength but also in frequency hence a thermocouple or rectifier type instrument is required. The voltmeter can be calibrated either empirically or if constants of the magnetic and electrical characteristics of the computer are known it can be calibrated by calculation. The voltmeter so calibrated is shown at 52. Tension spring 53 is used to keep roller 44 and plate cam against bracket roller 42 at all times.

Fig. VIII shows the same computer used with a hydraulic torquemeter as employed on some aircraft engines. Fluid under pressure from a hydraulic torquemeter is admitted into cylinder 54 which forces the piston 55 downwards and this movement is transmitted to sector 24 as indicated above through lever 56 tie rod 57 causing the same effect on the voltage generated as above.

Materials of construction of the computer unit must be carefully chosen as it is important that there should be no undesirable magnetic leakage. Therefore no magnetic materials should be used except in the rotor and stator for providing the magnetic field and its free circuit. The casings, mainshaft, split ring pins, and hardware, etc., should be of non-magnetic alloys or metals of appropriate strength such as aluminum alloys, gun metal bronze and like.

It is also important that the magnetic intensity of the poles on the rotor should be uniform throughout. To achieve this, the permanent magnets are stamped from laminations of homogenous materials and are made uniform in dimensions, and each being magnetized equally and aged. The laminations are assembled with spacers of non-magnetic or preferably diamagnetic laminations of the same section and thickness to confine and concentrate the magnetic flux in distinct channels or bands.

The field strength of the magnets should be low such that the induced magnetism in the stator laminations will be much below the magnetic saturation value to prevent side effects disturbing voltage induced in the coils. The electrical circuit is only required to produce a few milliamperes of current, at a voltage of about thirty or forty volts, hence demagnetizing effects due to current can be offset easily in the design by using minimum number of turns of fine wire for coils consistent with the low magnetic density required between the rotor and stator, minimum speed and other pertinent factors.

If this invention is to be used for computing horsepower in a traction dynamometer, the rotor is driven off the driving whee's at a predetermined ratio and the drawbar pull which shows tractive effort is made to operate the actuator, through mechanical or hydraulic means or otherwise.

For measurement of thrust horsepower of jet engines and gas turbines the rotor is driven by an air turbine suitably geared over the flight speeds of the aircraft and a device measuring thrust mechanically or hydraulically or otherwise is coupled to the actuator.

If it was required to use this device for measuring horsepower requirement of a machine or set of machinery driven by a shaft, a portable variable speed engine or motor fitted with a suitable torquemeter is used to drive the shaft to which is geared the computor. The horsepower for various speeds is plotted and an estimation is arrived at for the exact speed required.

Whereas the above detailed description of the computor gives only the method of variation of effective flux by movement of the permanent magnet field or rotor in and out of the stator, the invention also covers other forms of variation mentioned earlier, namely, with a magnetic shield in the gap between the rotor and stator as will be presently described.

Fig. IX shows a type of computor with the magnetic shield to vary magnetic flux. The external features and most of the parts are the same as in the unit hitherto described and therefore the common components and parts are similarly numbered, and new items are numbered separately. The rotor 13 is permanently positioned in the shaft 11. The magnetic shield 58 made of high permeable iron in the shape of a hollow cylinder, one end of which is free to slide between the rotor and stator in the gap, without touching either, the other end of the cylindrical shield is fitted to a shaped flanged arbour 59 which is bored to slide freely on the rotating main shaft. The actuating pin 27 engages the arbour and moves it forward and backwards according to the motion of the rack 25 and also prevents it rotating. Sector 24 is also urged or may be replaced by a hydraulic or pneumatic or other mechanical device.

Although the computor in this invention is primarily designed for computation of horsepower it can also be modified for computing the product of two variables one of which can be reduced to or translated as a function of speed of rotation of the rotor shaft.

For linear equations such as $x = y \times z$. The longitudinal section of the magnet pole and stator face are parallel, so as to provide an even distribution of flux. Laminated magnets are used as before. An enlarged gap section is detailed in Fig. IXA.

By altering the profile of the poles computations of certain sinusoidal or non linear equations can be effected within limits. When the profile of the magnet or stator is made a quadrant of a circle the computor can be used to solve sinusoidal equations such as $x = y \sin A$ or $X = Y \cos A$ and the like for all values of Y and values of A between 0° and 90°. An example as shown in Fig. IXB.

If the profile of either the magnet or stator is a straight line at an angle to the axis of the rotor as shown in Fig. IXC simple parabolic equations can be solved such as $X = YZ^n$ where $n$ is a constant and for all values of $n$ from zero to about 3.

It is envisaged that more complex equations containing two variables may be computed by adapting suitable shapes for pole profile.

The magnetic properties of the shield are important for it should have high permeability and low residual magnetism, and the dimensions should be such that magnetic saturation is not reached at any position.

Fig. X shows the computer with an electromagnetic rotor where flux variations are made electrically. The rotor 13 is integral with the shaft and carries soft iron poles 60 in which slots are cut to take coils 61, after the manner of a conventional alternator. The coils are carefully wound and matched, one for each pole, and wired in series. The current for these coils is led in by two slip rings and brushes shown in 62, 63, 62B and 63B respectively. The control of the current may be effected by means of a potentiometer rheostat shown at 64 which is fed from a battery 65 or other source of direct current. Contactor 66 is coupled to the actuator or torque measuring apparatus and movement of the actautor will cause change of potentiometer contactor 66 and thus change in current flowing in the coils. In this case also the material of the electromagnet cores should be selected for high permeability and low retentitivity and should not be worked at saturation levels.

Non linear actuators designed to move the second variable in some mathematical relationship other than direct proportion can be used if and when necessary through shaped cam mechanisms and the like.

The examples of the computor, accessories to the dynamometer, namely torquemeter and other apparatus described and illustrated are only representative and may take any other form to suit the requirements, and the examples should not be taken as final.

I claim:

1. A computing mechanism for calculations involving two variables comprising in combination an alternating current generator with a stator, conductors wound on the stator, a magnetic keeper coaxial with the stator and of similar material, dimensions and general form as said stator and positioned adjacent thereto, a rotor carrying a permanent magnet and mounted for rotation within the stator and keeper, means for rotating the rotor at a speed determined in accordance with one variable and means for moving the rotor longitudinally with respect to the stator and keeper, the amount of movement being determined in accordance with the other variable.

2. A computing mechanism for calculations involving two variables comprising in combination an alternating current generator with a stator, conductors wound on the said stator, a magnetic keeper coaxial with the stator and of the same material and dimensions as the stator and adjacent to it, a rotor carrying a circumferentially magnetized magnet equal in axial extent to the said stator, a shaft, a sleeve mounting for the said rotor on said shaft to enable said rotor to both rotate and slide along longitudinally on it within the limits of the stator and magnetic keeper, means for rotating the rotor at a speed determined by one variable and means for longitudinally displacing the rotor in accordance with the second variable, whereby flux from the rotor is diverted to the stator from the magnetic keeper as required by the second variable.

References Cited in the file of this patent

UNITED STATES PATENTS

| | | |
|---|---|---|
| 891,018 | Vawter | June 16, 1908 |
| 1,354,698 | Shallcross | Oct. 5, 1920 |
| 1,477,490 | Hough | Dec. 11, 1923 |
| 2,586,540 | Holden | Feb. 19, 1952 |
| 2,748,334 | Miller | May 29, 1956 |

FOREIGN PATENTS

| | | |
|---|---|---|
| 315,448 | Germany | Nov. 5, 1919 |
| 554,276 | Germany | July 7, 1932 |
| 470,233 | Italy | Mar. 28, 1952 |
| 703,531 | Great Britain | Feb. 3, 1954 |